US009916124B2

(12) United States Patent
Moeller et al.

(10) Patent No.: US 9,916,124 B2
(45) Date of Patent: *Mar. 13, 2018

(54) SYSTEM AND METHOD FOR CONTROLLING AND MONITORING A SOUND MASKING SYSTEM FROM AN ELECTRONIC FLOORPLAN (71) Applicant: 777388 Ontario Limited, Burlington (CA)

(72) Inventors: Niklas Moeller, Oakville (CA); Peter Babineau, Hamilton (CA)

(73) Assignee: 777388 Ontario Limited, Burlington (CA)

( * ) Notice: Subject to any disclaimer, the term of this patent is extended or adjusted under 35 U.S.C. 154(b) by 564 days.

This patent is subject to a terminal disclaimer.

(21) Appl. No.: 14/143,525

(22) Filed: Dec. 30, 2013

(65) Prior Publication Data

US 2014/0114623 A1 Apr. 24, 2014

Related U.S. Application Data (63) Continuation of application No. 12/134,798, filed on Jun. 6, 2008, now Pat. No. 8,666,086.

(51) Int. Cl.
*H04R 3/02* (2006.01)
*G06F 3/16* (2006.01)
(Continued)

(52) U.S. Cl.
CPC ............ *G06F 3/162* (2013.01); *G10K 11/175* (2013.01); *H04K 3/825* (2013.01); *H04K 3/42* (2013.01);
(Continued)

(58) Field of Classification Search
USPC ....................................... 381/73.1
See application file for complete search history.

(56) References Cited

U.S. PATENT DOCUMENTS 3,980,827 A 9/1976 Sepmeyer et al.
4,035,589 A 7/1977 Parke
(Continued)

FOREIGN PATENT DOCUMENTS

AU 2002234468 9/2002
CA 2438639 9/2002
(Continued)

OTHER PUBLICATIONS

"What is SoundMasker"; SoundMasker—White Noise Generator/ Sound Masking Software, Get a Good Nights Sleep; Copyright 2003 Vector Media; p. 1.
(Continued)

*Primary Examiner* — Disler Paul
(74) *Attorney, Agent, or Firm* — Workman Nydegger (57) ABSTRACT A system and mechanism for monitoring and/or controlling a sound masking system from a computer aided design drawing. According to an embodiment, the system is configured to allow an operator to "click" sound masking components on the design drawing and view operating/configuration settings, and/or edit, change or modify the operating/configuration settings, which are then applied via an interface to the associated physical sound masking component in the sound masking system. According to another embodiment, the system is configured to allow an operator to design or configure sound masking components on a design drawing. The sound masking components correspond to physical sound masking components in a sound masking system and comprise one or more active sound masking elements, which are configured to be responsive to an input and allow an operator to monitor, change and/or modify operating/configuration settings for physical sound masking component via the sound masking element in the design drawing.

9 Claims, 8 Drawing Sheets (51) Int. Cl.
*G10K 11/175* (2006.01)
*H04K 3/00* (2006.01)

(52) U.S. Cl.
CPC ............ *H04K 3/43* (2013.01); *H04K 2203/12* (2013.01); *H04K 2203/34* (2013.01)

(56) References Cited

U.S. PATENT DOCUMENTS

| | | |
|---|---|---|
| 4,052,720 A | 10/1977 | McGregor et al. |
| 4,054,751 A | 10/1977 | Calder et al. |
| 4,185,167 A | 1/1980 | Cunningham et al. |
| 4,241,235 A | 12/1980 | McCanney |
| 4,319,088 A | 3/1982 | Orfield |
| 4,438,526 A | 3/1984 | Thomalla |
| 4,476,572 A | 10/1984 | Horrall et al. |
| 4,612,665 A | 9/1986 | Inami et al. |
| 4,686,693 A | 8/1987 | Ritter |
| 4,761,921 A | 8/1988 | Nelson |
| 4,914,706 A | 4/1990 | Krause |
| 5,386,478 A | 1/1995 | Plunkett |
| 5,406,634 A | 4/1995 | Anderson et al. |
| 5,440,644 A | 8/1995 | Farinelli et al. |
| 5,666,424 A | 9/1997 | Fosgate et al. |
| 5,675,830 A | 10/1997 | Satula |
| 5,689,229 A | 11/1997 | Chaco et al. |
| 5,764,763 A | 6/1998 | Jensen et al. |
| 5,826,172 A | 10/1998 | Ito et al. |
| 5,887,067 A | 3/1999 | Costa et al. |
| 6,145,085 A | 11/2000 | Tran et al. |
| 6,188,771 B1 | 2/2001 | Horrall |
| 6,329,908 B1 | 12/2001 | Frecska |
| 6,389,139 B1 | 5/2002 | Curtis et al. |
| 6,594,365 B1 | 7/2003 | Eatwell |
| 6,775,355 B1 | 8/2004 | Bingel et al. |
| 6,847,625 B2 | 1/2005 | Heinonen et al. |
| 6,888,945 B2 | 5/2005 | Horrall |
| 7,194,094 B2 * | 3/2007 | Horrall ................ G10K 11/175 381/73.1 |
| 7,471,797 B2 | 12/2008 | Moeller et al. |
| 7,571,014 B1 | 8/2009 | Lambourne |
| 8,107,639 B2 | 1/2012 | Moeller et al. |
| 8,477,958 B2 | 7/2013 | Moeller et al. |
| 8,666,086 B2 | 3/2014 | Moeller et al. |
| 8,817,999 B2 | 8/2014 | Moeller et al. |
| 2002/0072816 A1 | 6/2002 | Shdema et al. |
| 2002/0150261 A1 | 10/2002 | Moeller et al. |
| 2003/0091199 A1 | 5/2003 | Horrall et al. |
| 2003/0107478 A1 | 6/2003 | Hendricks et al. |
| 2003/0142833 A1 | 7/2003 | Roy et al. |
| 2003/0144847 A1 | 7/2003 | Roy et al. |
| 2003/0198339 A1 | 10/2003 | Roy et al. |
| 2003/0198353 A1 * | 10/2003 | Monks ................ H04S 7/301 381/58 |
| 2003/0219133 A1 | 11/2003 | Horrall et al. |
| 2004/0013281 A1 | 1/2004 | Garstick |
| 2004/0131199 A1 | 7/2004 | Moeller et al. |
| 2004/0179699 A1 | 9/2004 | Moeller et al. |
| 2004/0240686 A1 | 12/2004 | Gibson |
| 2007/0133816 A1 | 6/2007 | Horrall et al. |
| 2008/0243211 A1 * | 10/2008 | Cartwright ........... G10K 11/175 607/63 |
| 2009/0116659 A1 | 5/2009 | Moeller et al. |
| 2013/0243215 A1 | 9/2013 | Moeller et al. |

FOREIGN PATENT DOCUMENTS

| | | |
|---|---|---|
| CA | 2681915 | 9/2002 |
| CA | 2845172 | 9/2002 |
| CA | 2422086 | 9/2004 |
| CA | 2690511 | 9/2004 |
| CA | 2653803 | 1/2008 |
| CA | 2634268 | 12/2009 |
| CN | 2807092.5 | 6/2004 |
| EP | 1364363 | 11/2003 |
| EP | 2036077 | 1/2008 |
| WO | 02/069317 | 9/2002 |
| WO | 2008/000092 | 1/2008 |

OTHER PUBLICATIONS

Atlas Sound MG2500 Sound Masking Generator with 2-Ennis, Channel DSP and Page Input Operation Manual. Atlas Sound, TX; Apr. 2002.
XICOR Application Note, AN115, 1998, "A Compendium of Application Circuits for Xicor's Digitally-Controlled (XDCP) Potentiometers" by Wojslaw, pp. 1-4.
http://drugstore.com; HoMedics SoundSpa Acoustic Relaxation Machine, Model SS-200-3PK; p. 1-3.
http://marpac.com/sound-cond.asp; Sound Conditioners; pp. 1-6.
http://store.yahoo.com/egeneralmedical/no.html; Sound Conditions, White Noise Machines and Safety Lights; pp. 1-2.
http://www.maggiescottage.com/soundtherapy.html; Maggies Cottage-Homedics White Noise Machine & SensorySound Spa; pp. 1-2.
http://www.officebuzz.qpg.com/; The Sonet Acoustic Privacy System; pp. 1-2.
http://www.sharperimage.com; Search by Keyword: Sound Soother; pp. 1-6.

* cited by examiner

SYSTEM AND METHOD FOR CONTROLLING AND MONITORING A SOUND MASKING SYSTEM FROM AN ELECTRONIC FLOORPLAN

FIELD OF THE INVENTION

The present invention relates to sound masking systems and more particularly to a system and method for controlling and/or monitoring a sound masking system from an electronic floorplan or CAD drawing.

BACKGROUND OF THE INVENTION

Sound masking systems are widely used in offices and similar workplaces where an insufficient level of background sound results in diminished speech and conversational privacy. Such environments typically suffer from a high level of noise distractions, and lower comfort levels from an acoustic perspective. Sound masking systems operate on the principle of masking, which involves generating a background sound in a given area. The background sound has the effect of limiting the ability to hear two sounds of similar sound pressure level and frequency simultaneously. By generating and distributing the background noise in the given area, the sound masking system masks or covers the propagation of other sounds in the area and thereby increases speech privacy, reduces the intrusion of unwanted noise, and improves the general acoustic comfort level in the area or space.

Sound masking systems are of two main types: centrally deployed systems and independent self-contained systems. In a centrally deployed system, a central noise generating source supplies a series of loudspeakers installed throughout the physical area or space to be covered. The independent self-contained system comprises a number of individual self-contained sound masking units, which are installed in the physical space. The sound masking units operate independently of each other.

More recently, networked sound masking systems have been successfully introduced into the art.

There remains a need for improvements in the configuration and/or control of a sound masking system and/or sound masking units.

BRIEF SUMMARY OF THE INVENTION

The present invention provides system and method for configuring and/or controlling or monitoring a sound masking system from an electronic floor plan or CAD drawing.

According to one aspect, the present invention comprises an apparatus for controlling a sound masking system in a physical space, the apparatus comprises: an electronic rendering representing the physical space and including a graphical element for each sound masking component in the sound masking system; a user interface configured for applying one or more inputs to control parameters associated with at least some of the sound masking components; a controller module configured to be responsive to at least some of the one or more inputs and generate one or more control signals; and an interface configured for passing the one or more control signals to the sound masking system for controlling one or more of the sound masking components.

According to another aspect, the present invention comprises an apparatus for monitoring a sound masking system installed in a physical space, the apparatus comprises: an electronic rendering representing the physical space and including one or more graphical elements corresponding to one or more sound masking components in the sound masking system; a controller configured to receive operational information for the one or more sound masking components in the sound masking system; and one or more of the graphical elements being configured to receive the operational information for the corresponding sound masking component; and the one or more graphical elements being configured to display the operational information in response to an input.

According to another aspect, the present invention comprises an apparatus for configuring a sound masking system for a physical space, the apparatus comprises: a component configured to generate an electronic rendering depicting the physical space; a component configured to place one or more sound masking elements on the electronic rendering, each of the one or more sound masking elements representing a corresponding sound masking component in the sound masking system; a controller configured to interface with the sound masking system and receive information associated with the operation of the sound masking components; and each of the one or more sound masking elements including a mechanism configured to display the received information associated with the operation of the corresponding sound masking component.

According to another aspect, the present invention comprises computer program product for monitoring a sound masking system installed in a physical space, the computer program comprises: a storage medium configured to store computer readable instructions; the computer readable instructions comprising, displaying an electronic rendering of the physical space, and the electronic rendering including one or more graphical elements corresponding to sound masking components in the sound masking system; activating one or more of the graphical elements in response to an input; retrieving operational information for sound masking components corresponding to the one or more activated graphical elements; and displaying said retrieved operational information.

According to another aspect, the present invention comprises a computer program product for controlling a sound masking system installed in a physical space, the computer program comprises: a storage medium configured to store computer readable instructions; the computer readable instructions comprising, displaying an electronic rendering of the physical space, and the electronic rendering including one or more graphical elements corresponding to sound masking components in the sound masking system; activating one or more of the graphical elements in response to an input; retrieving operational information for sound masking components corresponding to the one or more activated graphical elements; receiving one or more inputs to modify the operational information; generating one or more control signals corresponding to the modified operational information; and applying the one or more control signals to the associated sound masking component.

According to another aspect, the present invention comprises a computer program product for configuring a sound masking system.

According to another aspect, the present invention comprises a method for controlling a sound masking system.

According to another aspect, the present invention comprises a method for monitoring a sound masking system.

According to another aspect, the present invention comprises a method for configuring a sound masking system.

Other aspects and features of the present invention will become apparent to one ordinarily skilled in the art upon review of the following description of specific embodiments of the invention in conjunction with the accompanying figures.

BRIEF DESCRIPTION OF THE DRAWINGS

Reference is now made to the accompanying drawings which show, by way of example, embodiments of the present invention, and in which.

DETAILED DESCRIPTION OF THE INVENTION

Figure 1:
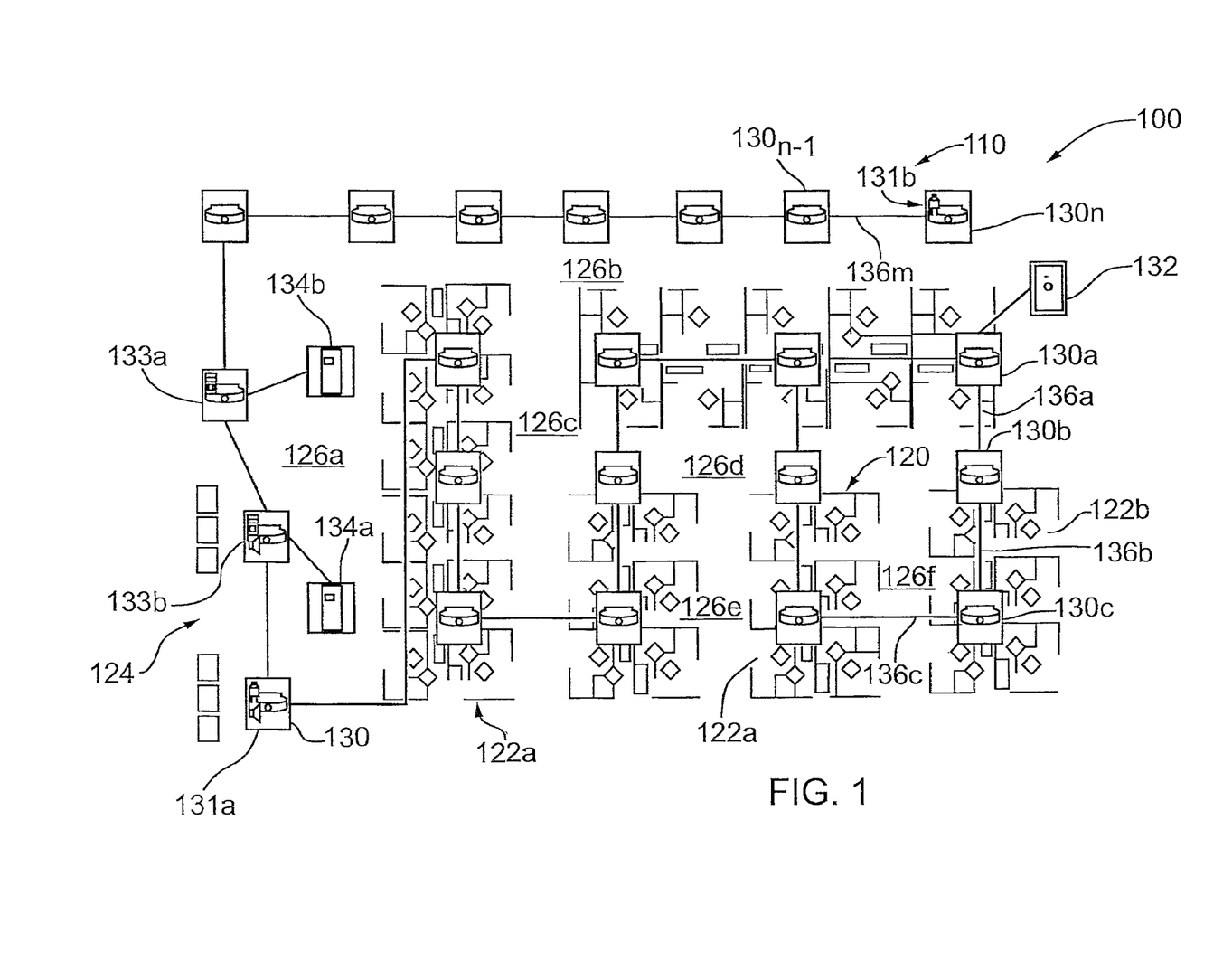
FIG. 1 shows in schematic form a sound masking control mechanism in conjunction with an electronic floor plan or CAD drawing, according to an embodiment of the present invention.

Reference is made to FIG. 1, which shows a sound masking configuration and control system according to an embodiment of the present invention and indicated generally by reference 100. The sound masking configuration and control system 100 comprises an active sound masking component layer 110 and an electronic design drawing 120. The electronic design drawing 120 comprises a floor plan or architectural drawing rendered in an electronic format for display on a computer display terminal. In the context of the present description, the design drawing 120 comprises a design drawing generated by the AUTOCAD™ software application.

As shown in FIG. 1, the design drawing 120 depicts an office space on a floor of a building. The office space comprises a number of workstation or cubicle groups 122, indicated individually by references 122a, 122b, ... 122n, a main entrance and reception area 124, and corridors 126, indicated individually by references 126a, 126b, ... 126f. In accordance with an embodiment, the sound masking component layer 110 comprises a sound masking system which is laid out or configured on the office space floor plan for installation and subsequent control. As shown, the sound masking component layer 110 comprises one or more networkable sound masking hubs 130, indicated individually by references 130a, 130b, 130c and 130d, a control panels 132, and keypads 134, indicated individually by references 134a and 134b, in FIG. 1, According to another aspect, the sound masking hubs 130 may comprise different types of sound masking hubs, for example, a power hub 131a or 131b, an accessory hub 133b or 133c, or a primary hub. The sound masking component layer 110 may also include wire or cable runs 136, indicated individually by references 136a, 136b, 136c ..., for interconnecting components.

In the context of the present description, the sound masking system physically installed in the building and represented by the sound masking component 110 comprises a networked sound masking system, for example, as described in US Patent Application Publication No. 2004/0131199 (filed Aug. 25, 2003) and US Patent Application Publication No. 2002/0150261 (filed Feb. 26, 2001), both applications are owned in common by the assignee of the present application, and are incorporated by reference herein in their entirety.

As will be described in more detail below, the sound masking configuration and control system 100 comprises a mechanism that allows an operator to layout and configure a sound masking system on the design drawing 120. According to another embodiment, the sound masking configuration and control system 100 comprises a mechanism that allows an operator to control and/or change settings or operational parameters for the sound masking system or components.

According to an embodiment, the sound masking configuration and control system 100 includes the following functionality for configuring a sound masking system on a design drawing:

load and save design drawing, e.g. compatible with an AUTOCAD™ DWG type file placing of components on the design drawing, e.g. sound masking hubs 130, control panels 132, keypads 134, cables 136 and other related components; according to an embodiment, the placement/configuration of components is performed by an operator; according to another embodiment the placement/configuration of components comprises a semi-automated process, wherein the system 100 is configured to place a grid of sound masking hubs 130 according to a spacing and/or row/column configuration specified by the operator and/or according to other design rules editing of components, i.e. the system 100 is configured to allow an operator to relocate, delete, add components or change components (e.g. change hub types—primary, power or accessory hubs, cable types) as desired adjusting spacing of components on the design drawing; the system 100 is configured to allow an operator to adjust the spacing between components automatically to a new specified distance, for example, change spacing between sound masking units from 14 feet to 16 feet perform cabling design connections; according to an embodiment, the system 100 is configured to allow an operator to manually interconnect the components with wire; according to another embodiment, the system 100 is configured to allow an operator to click from one component to another component and distance information from the design drawing is used to determine the distance between the components and the length of wire or cable required to connect auto-cabling adjustment; according to an embodiment, the system 100 is configured to relocate components on the design drawing that have already been "wired" or connected, and includes adjustment of the wires in real-time planning for cable trays; according to an embodiment, the system 100 is configured to allow an operator to plan for cable lengths for cable running along cable trays or other structures in the building space; according to an embodiment, the system 100 is configured for the operator to add "nodes" along the cable and "drag" (e.g, using a mouse or other pointing device) the nodes to match the desired cabling path auto-numbering of networked sound masking components; according to an embodiment, the system 100 is configured to number, for example, in a sequential order, number and/or network address power planning; according to an embodiment, the system 100 is configured to provide power consumption information for the sound masking component configuration different component views; according to an embodiment, the system 100 is configured to represent the sound masking components in two-dimensional (2D) CAD icons or more realistic three-dimensional (3D) CAD icons; according to another embodiment, the components may be represented using shapes, e.g, squares, circles, etc.

annotation; according to an embodiment, the system 100 is configured to annote, i.e. add notes to the design drawing take-offs; according to an embodiment, the system 100 is configured to calculate an inventory of the components for the sound masking system layer control; according to an embodiment, the system 100 is configured to configure the sound masking layout on a single layer or multiple layers on the design drawing; a multiple layer representation allows an operator to hide/show various aspects of the sound masking configuration, for example, only wiring rules-based design; according to an embodiment, the system 100 is configured to execute configuration based on rules, for example, in the sound masking application, the system 100 is configured to apply rules regarding maximum components numbers per control panel, requirements for terminating power hubs, requirements for pairing keypads and accessory hubs, rules for maximum wire runs, and the like The operation of the sound masking configuration and control system 100 is described in more detail below according to the embodiments depicted in FIGS. 2 to 8.

Figure 2:
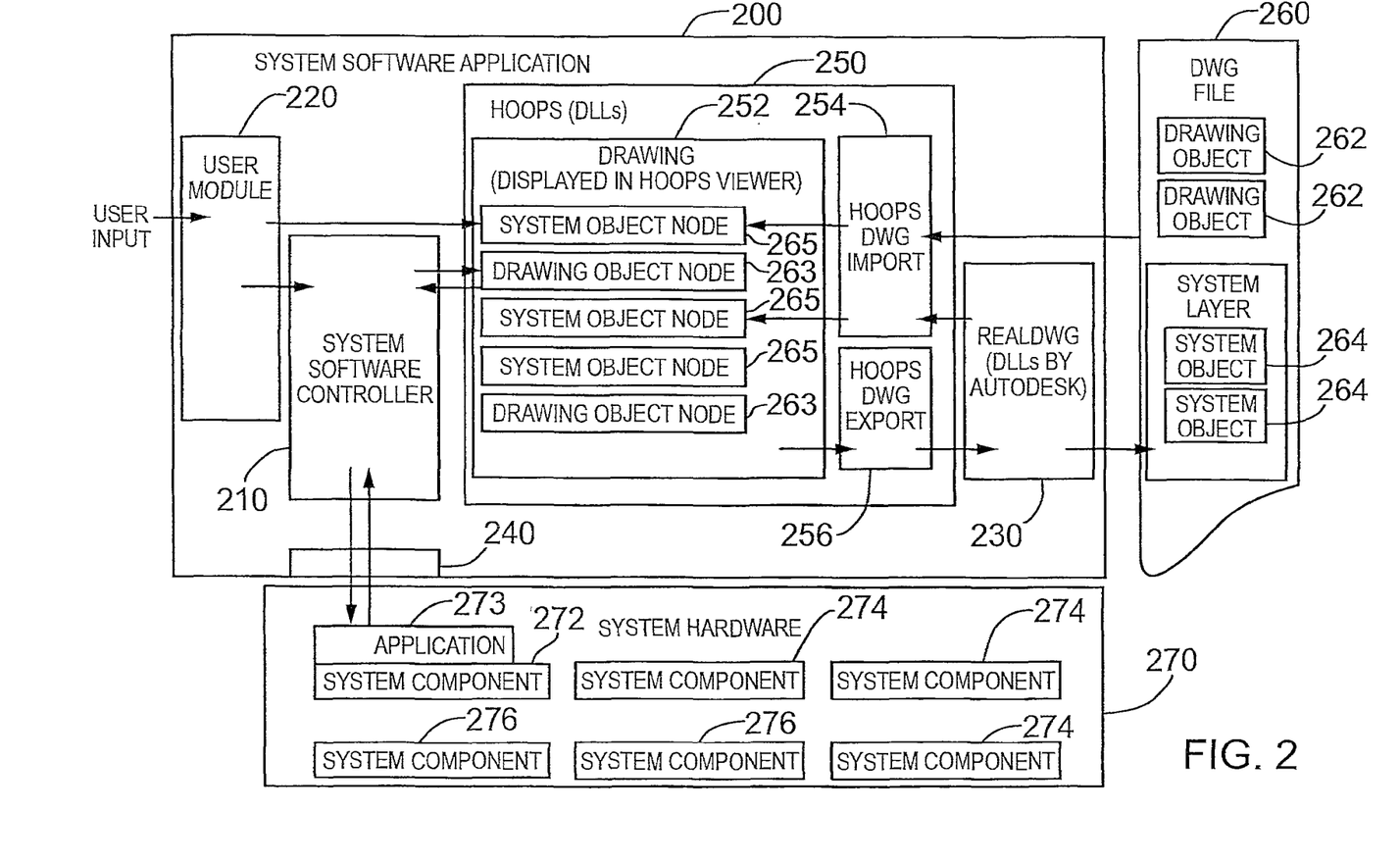
FIG. 2 shows a sound masking control system according to an embodiment of the present invention.

Reference is next made to FIG. 2, which shows in block diagram form an embodiment of the sound masking configuration and control system. The sound masking configuration and control system is indicated generally by reference 200 and according to this embodiment comprises an application implemented in software and comprises a plurality of code components, i.e. functions, objects and/or routines. As shown, the system software application 200 comprises a system software controller 210, a user interface module 220, a design drawing application interface 230 and a sound masking network interface 240. As shown, the software application 200 is also implemented with a drawing viewer module 250. The drawing viewer module 250 is configured to display the design drawing and sound masking component layer(s) indicated generally by reference 252. The drawing 252 comprises system object nodes 265 (corresponding to elements in the sound masking component layer) and drawing object nodes 263 (corresponding to elements in the design drawing). According to an embodiment, the drawing viewer module 250 is implemented using HOOPS™ technology available from Techsoft3d. The particular implementation details for the system software application 200 and related components/objects to provide the functionality as described herein will be apparent to one skilled in the art. According to an embodiment, the system software application 200 resides on a computer disk or other machine readable media and is loaded onto a computer for execution.

The design drawing application interface 230 provides an interface between the software application 200 and a drawing file 260. The drawing file 260 comprises the design drawing 120 (FIG. 1) and the sound masking component layer 110 (FIG. 1). In the context of an AUTOCAD™ application program, the application interface 230 comprises Dynamic-Link Libraries (DLL's) as will be understood by one skilled in the art. The DLL's in the application interface 230 function to interface the drawing viewer module 250 with the drawing file 260. The drawing (DWG) file 260 comprises drawing objects 262 associated with the electronic design drawing 120 (FIG. 1), and system objects 264 associated with the sound masking component layer 110 (FIG. 1). As shown, the drawing viewer module 250 includes an import module 254 configured to import drawing objects 262 and system objects 264 from the drawing file 260. For the system objects 264 (i.e. for the sound masking component layer 110), the import module 254 interfaces to the application interface 230 and is configured to import the system objects 264 from the drawing file 260. The drawing viewer module 250 includes an export module 256 configured to export drawing objects 262 and/or system objects 264 via the application interface 230 to the drawing file 260 (i.e. the AUTOCAD™ file).

Referring again to FIG. 2, the sound masking interface 240 is configured to provide an interface between the system software controller 210 and the hardware comprising the sound masking system hardware indicated generally by reference 270. The sound masking system hardware, for example in a network configuration, comprises one or more control panels 272, one or more sound masking hubs 274 and one or more keypads 276. The particular implementation details of a networked sound masking system is described in US Patent Application Publication No. 2004/0131199 (filed Aug. 25, 2003) and US Patent Application Publication No. 2002/0150261 (filed Feb. 26, 2001), both applications are owned in common by the assignee of the present application, and are incorporated by reference herein in their entirety. As shown, the control panel 272 includes an application 273 which provides an interface to receive/transmit control commands and status requests from/to the system software controller 210 via an interface 240 which is configured to "talk" with the sound masking system 270. The application 273 is configured to translate or otherwise convert the control commands (messages or signals) to configure, control or monitor the components in the sound masking system 270, for example, to provide functionality as described herein.

Figure 7:
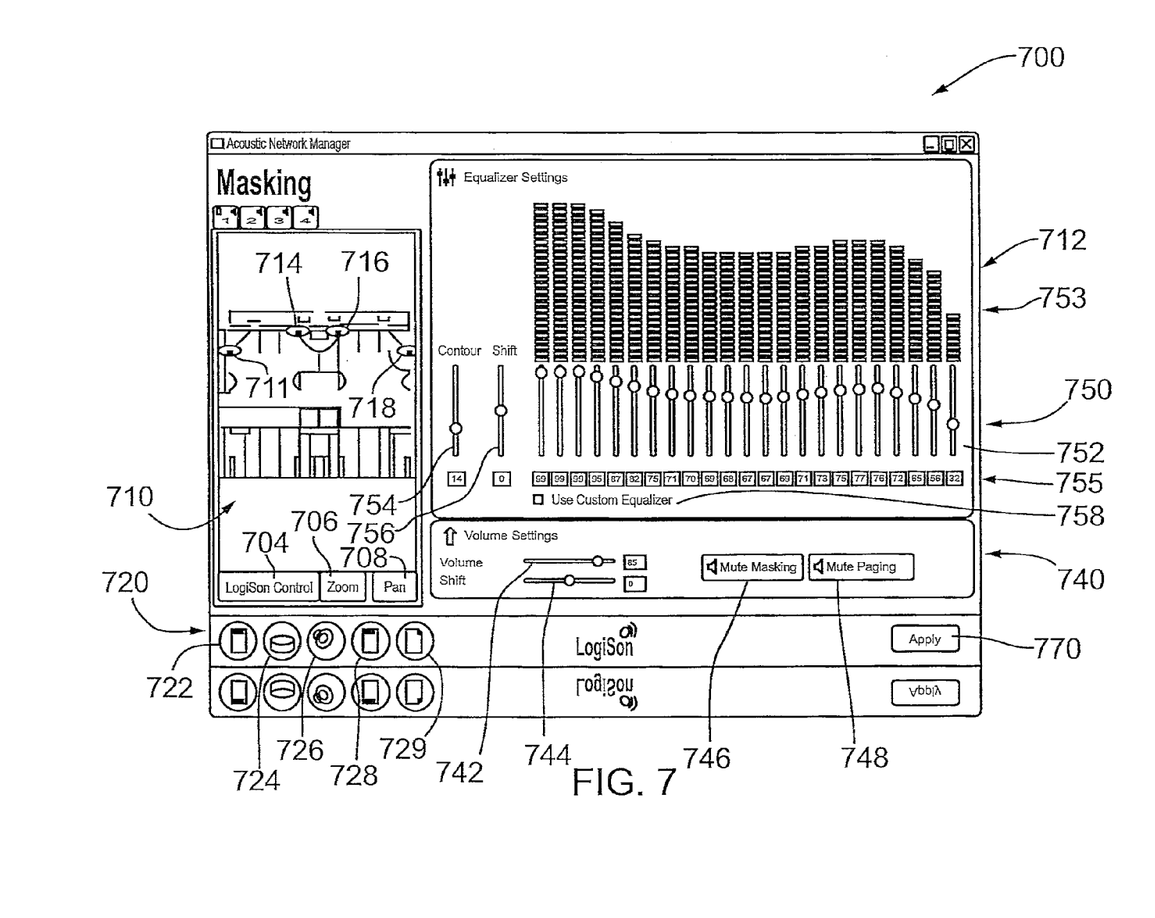
FIG. 7 shows a screen shot of a user interface for controlling a sound masking system according to an embodiment of the present invention.
Figure 8:
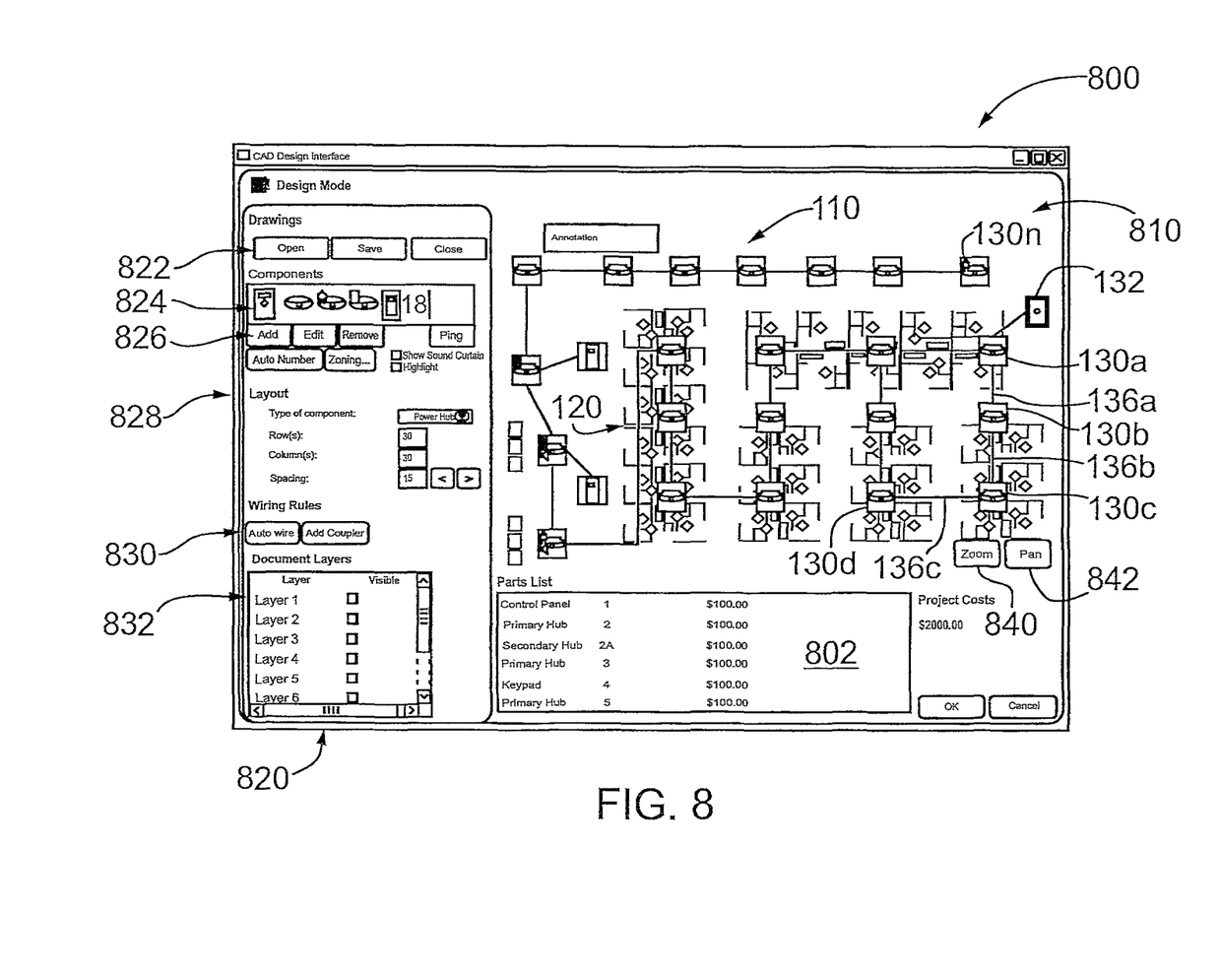
FIG. 8 shows a screen shot of a user interface for designing or configuring a sound masking system according to an embodiment of the present invention.

The user interface module 220 may be implemented as a graphical user interface according to an embodiment as depicted in the screen shot of FIG. 7, and according to another embodiment as depicted in the screen shot of FIG. 8. As will be described in more detail with reference to FIG. 7, the graphical user interface is configured to allow a user (i.e. an operator or technician) to control and/or monitor the sound masking system 270. The graphical user interface depicted in FIG. 8 is configured to allow a user to design or configure the sound masking component layer 110 (FIG. 1) for the design drawing 120 (FIG. 1) as will also be described in more detail below.

Figure 3:
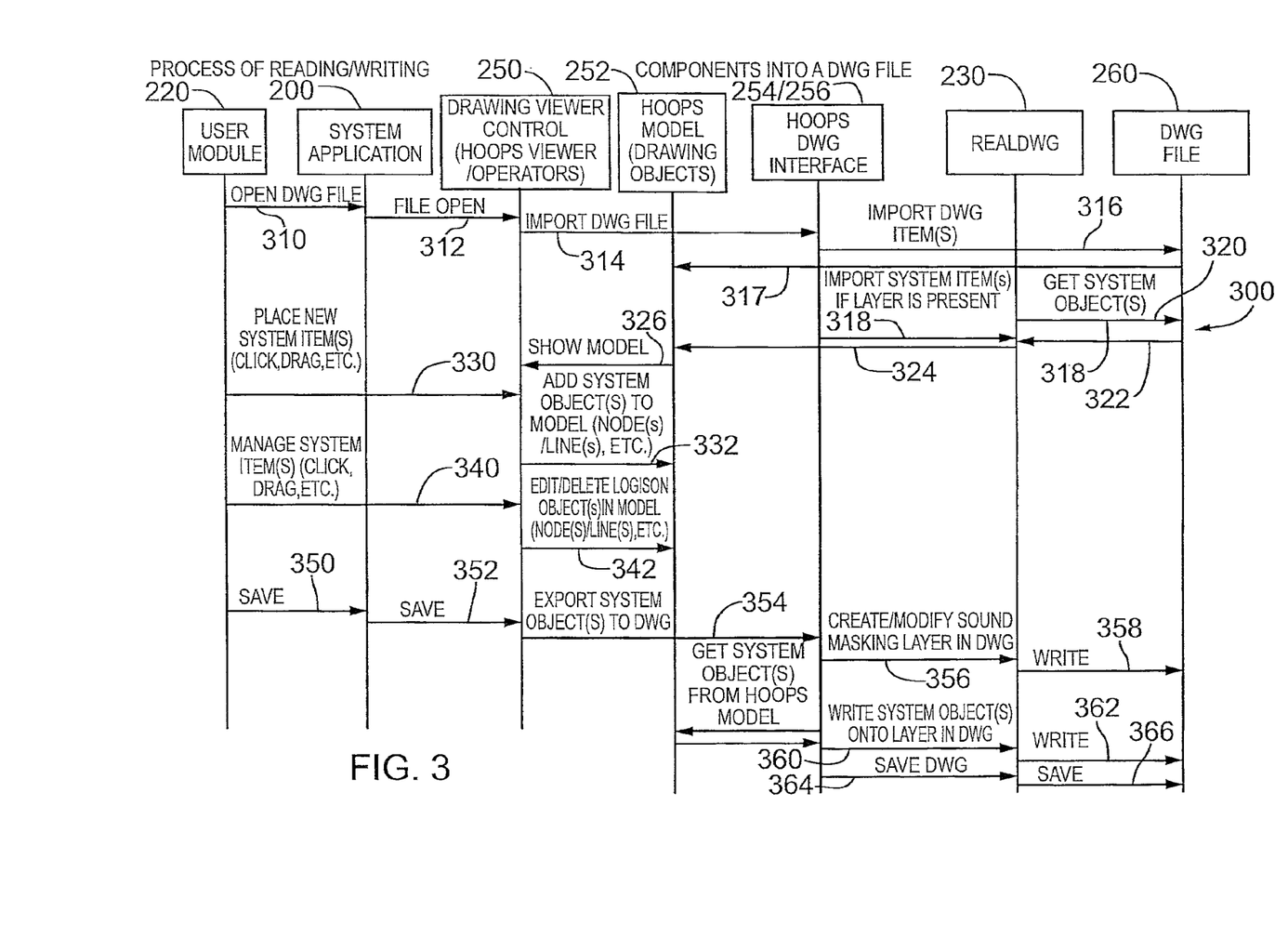
FIG. 3 shows a process flow diagram for a reading/writing process for the system of FIG. 2 according to an embodiment of the present invention.

Reference is next made to FIG. 3, which shows an exemplary process/data flow for reading/process of sound masking components to the drawing file 260 (FIG. 2) according to an embodiment of the invention.

As shown, a request is generated by the user interface module 220 (for example, in response to an input from an operator or a designer) to open a DWG file 260, as indicated by process flow reference 310. The software application 200 is configured to open a file, as indicated by process flow reference 312, the drawing viewer module 250 is configured to execute an import operation for the DWG file, as indicated by reference 314. In response, the import module 254 imports the drawing items, i.e. the drawing objects 262, from the DWG file 260, as indicated by process flow reference 316. The drawing viewer module 250 receives the drawing objects 262 and generates a drawing model 252 for display in a window or screen 710 for example as depicted in the graphical user interface 700 in FIG. 7. If there are sound masking drawing objects 264 (i.e. a sound masking component layer 110) in the design drawing 120, the import module 254, imports the sound masking drawing items, i.e. the system objects 264, from the DWG file 260 via the interface 230, as indicated by process flow references 318, 320 and references 322, 324. The drawing viewer module 252 is configured to generate the corresponding drawing model 252 for displaying the sound masking component layer 110 (FIG. 1) and the design drawing 120 (FIG. 1), as indicated by reference 326.

Referring again to FIG. 3, the user interface module 220 (FIG. 2) is configured to allow an operator (e.g. a designer) to configure the sound masking component layer 110 with additional components (e.g. objects for one or more sound masking control panel(s), sound masking hub(s), sound masking keypad(s), cables, couplers, and other related components), as indicated by process flow reference 330. According to an embodiment, the graphical user interface 800 is configured to be responsive to "clicking and dragging" using a mouse or other pointing device to place sound masking objects in the sound masking component layer 110 (FIG. 1), as indicated by process flow reference 332. For example, the sound masking objects are depicted using graphical icons as indicated by references 130a, 130b, 130c, 132, 134a, 134b and 134c in FIG. 8 and displayed in a viewer window 810 of the graphical user interface screen 800 as shown in FIG. 8. According to this aspect, the operator, i.e, designer, is using the system software application 200 to configure a sound masking system for the floor plan depicted in the design drawing 120 (FIG. 1).

Referring to FIG. 3, the user interface module 220 (FIG. 2) is configured to allow an operator (e.g. a technician) to control or manage the sound masking components defined in the sound masking component layer, as indicated by process flow references 340 and 342. According to this aspect, the operator is given the capability to click on a sound masking component shown in the sound masking component layer (for example as depicted in FIG. 1, or the sound masking component layer displayed in the viewer window 710 of the user interface screen 700 in FIG. 7), and in response the operator is enabled to change or modify operational parameters and/or change the type of sound masking hub (e.g. power hub) for the physical device associated with the sound masking component.

In response to a SAVE command or input from the user interface module 220, the application 200, i.e. the system software controller 210, is configured to save the system object nodes 265 and the drawing object nodes 263 (as indicated by process flow references 350, 352) and export them via the drawing (DWG) export module 256, to the drawing application interface 230 (as indicated by process flow references 354, 356). The drawing application interface 230 is configured to convert the drawing object nodes 263 and the system object nodes 265, for example, utilizing DLL's, and a sound masking component layer is created (as indicated by reference 356) and written to the drawing (DWG) file 260, as indicated by process flow reference 358. According to another aspect, the drawing application interface 230 is configured to convert the drawing objects 263, and write the objects to the drawing (DWG) file 260, as indicated by process flow references 360, 362. According to another aspect, the drawing application interface 230 is configured to perform a SAVE operation as indicated by process flow references 364, 366.

Figure 4:
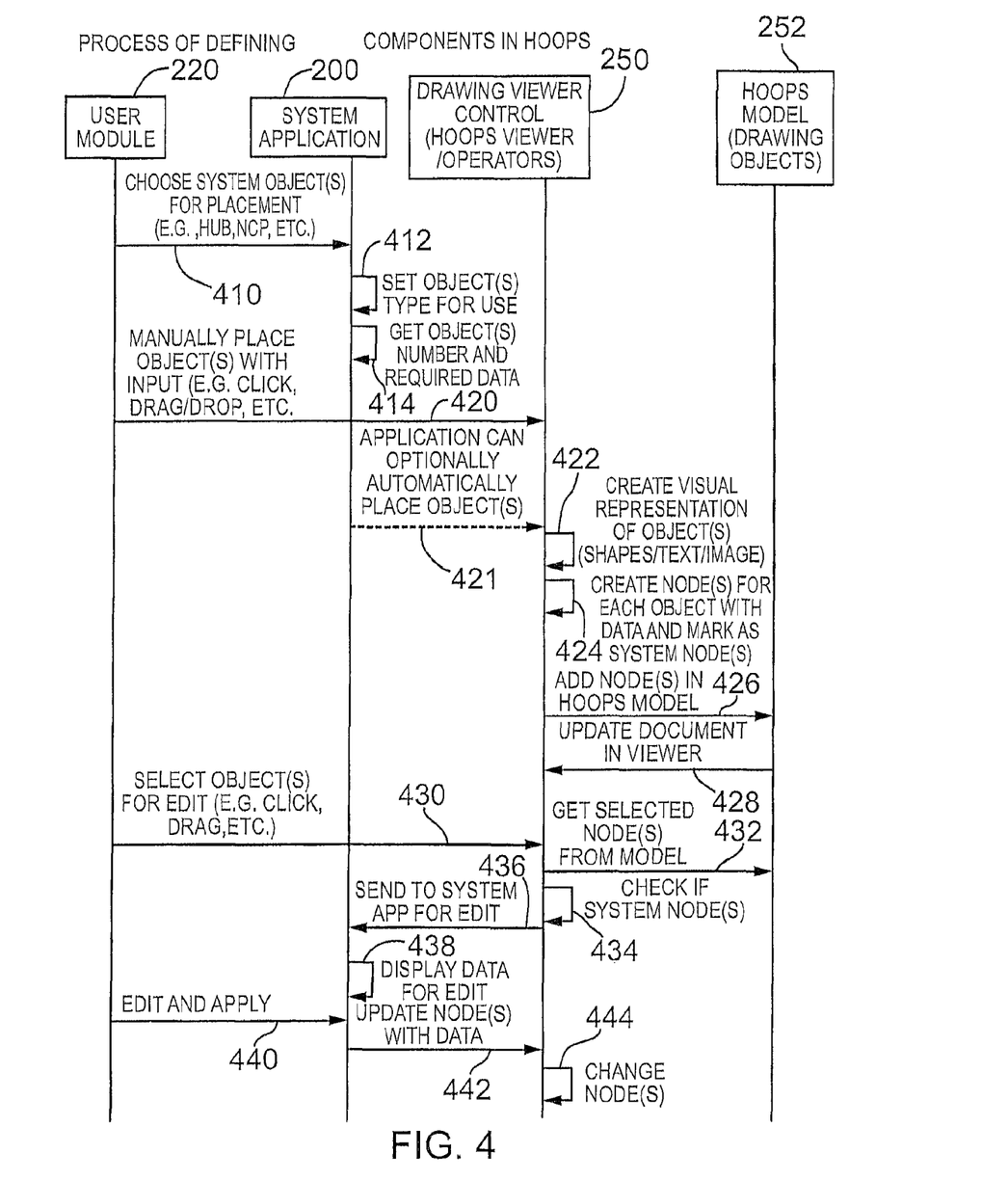
FIG. 4 shows a process flow diagram for a process for defining or configuring sound masking components for the system of FIG. 1 according to an embodiment of the present invention.

Reference is next made to FIG. 4, which shows an exemplary process/data flow for defining sound masking components in the software application 200 (FIG. 2) according to an embodiment of the invention.

Figure 6:
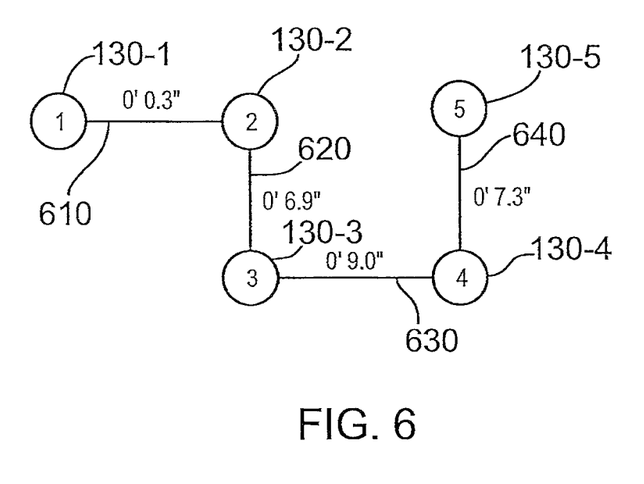
FIG. 6 shows a schematic diagram of a sound masking configuration according to an embodiment of the present invention.

The user interface module 220 is configured to allow an operator to choose sound masking components for placement on the sound masking component layer 110 (FIG. 1) of the design drawing 120 (FIG. 1), as indicated by process flow reference 410. The system software application 200 is configured to set an object corresponding to the selected component, as indicated by process flow reference 412. The system software application 200 may be configured to further define and retrieve data or operating (e.g. default) parameters for the sound masking object, as indicated by process flow reference 414. For example, the system software application 200 is configured to number the sound masking "hubs" (130-1, 130-2, 130-3, 130-4 and 130-5) as shown in FIG. 6 and/or also configured to determine the cable lengths (e.g. auto-cable adjustment function) as indicated by references 610 (0' 0.3"), 620 (0' 6.9"), 630 (0' 9.0"), 640 (0' 7.3") and shown in FIG. 6. According to another aspect, the user interface module 220 is configured to allow a user (e.g. a designer) to manually place the selected object(s), for example, using a mouse or other pointing device to "click" and "drag/drop" the object on the sound masking component layer 110 (FIG. 1) being displayed by the drawing viewer module 250, as indicated by process flow reference 420. According to another embodiment, the system software application 200 is configured to automatically place the selected object(s) in the sound masking component layer, as indicated by process flow reference 421. The drawing viewer module 250 is configured to create a visual representation of the object (e.g. shape, text, icon/image), as indicated by process flow reference 422. The drawing viewer module 250 is configured to create node(s) associated with the object, as indicated by process flow reference 424, and add the node(s) to the drawing model 252, as indicated by process flow reference 426. The drawing viewer module 250 can also update the display of the sound masking component layer 110 and/or design drawing 120 in the viewer window 710 (FIG. 7).

According to another aspect, the user interface module 220 (i.e. the system software application 200) is configured to allow an operator to select and edit objects on the sound masking component layer 110 and/or the design drawing 120, as indicated by process flow reference 430. In response to the user request, the drawing viewer module 250 retrieves the selected node(s), as indicated by process flow reference 432, and a check is made to determine if the selected node(s) are for the sound masking component layer 110 as indicated by process flow reference 434. If yes, then the retrieved node(s) are passed to the system application 200 for editing (as indicated by process flow reference 436) and for display on the viewer 710 (as indicated by process flow reference 438). According to a further aspect, the user interface module 220 is configured to edit and apply node(s) as indicated by process flow references 440, 442 and 444 in FIG. 4.

Figure 5:
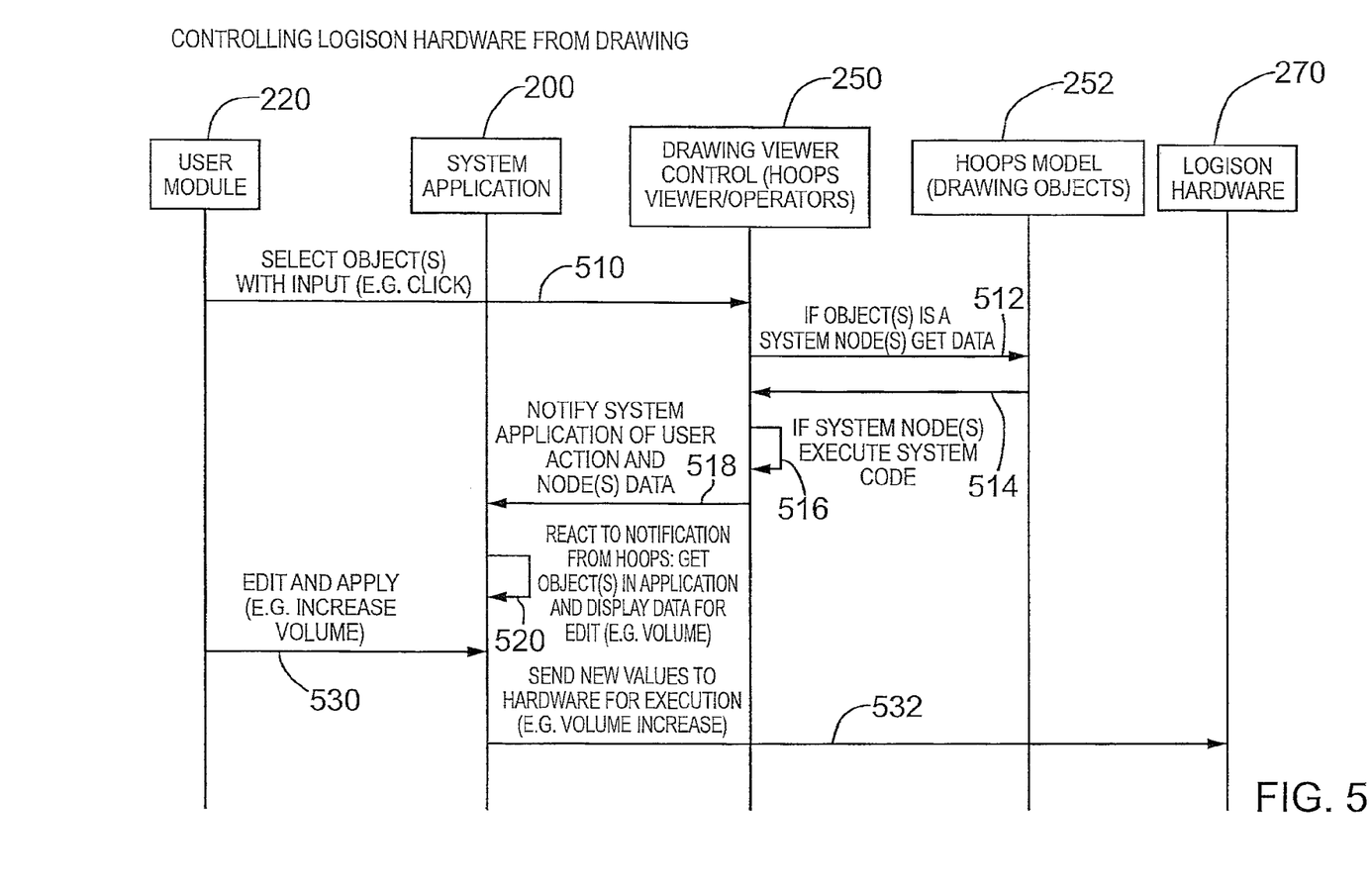
FIG. 5 shows a process flow diagram for a process for controlling sound masking components for the system of FIG. 1 according to an embodiment of the present invention.

Reference is next made to FIG. 5, which shows an exemplary process/data flow for using the sound masking component layer 110 (i.e. the viewer window 710 in FIG. 7) to control and/or monitor the corresponding sound masking components in the sound masking network 270 (FIG. 2) according to an embodiment of the invention.

The user interface module 220 (i.e. the software application 200) is configured to allow an operator to select an object on the sound masking component layer 110 (FIG. 1) or the design drawing 120 (FIG. 1) and the selected object is passed to the drawing viewer module 250, as indicated by process flow reference 510. The drawing viewer module 250 is configured to determine if the selected object(s) correspond to a sound masking component (i.e. node). If yes, the drawing viewer module 250 is configured to retrieve data (and operational parameters) associated with the selected sound masking component from the objects module 252, as indicated by process flow references 512 and 514. According to another aspect, the drawing viewer module 250 is configured to execute any customized features (e.g. code) associated with the selected node, as indicated by reference 516. The drawing viewer module 250 is configured to then notify the system software controller 210 of the user action and data for the node, as indicated by process flow reference 518. The system software controller 210 is configured to respond to accept the data from the drawing viewer module 250 and configured to display the object and any associated data or parameters for editing or user input, as indicated by process flow references 520, 530. For example, the system software controller 210 displays a sound masking unit object and the volume data for adjusting the masking signal volume in response to a user input. As also shown in FIG. 5, the user interface module 220 is configured to receive the user input, e.g. volume adjust, and pass the data to the controller 210. The software controller 210 is configured to receive the operational data and generate an appropriate command or message, which is then used to control the associated sound masking component in the sound masking network 270, as indicated by process flow reference 532. According to an embodiment, the system controller 210 is configured to interface with the sound masking network 270 via the application 273 (FIG. 2).

Reference is next made to FIG. 7, which shows a screenshot of an exemplary graphical user interface screen 700 for the user interface module 220 (FIG. 2) and configured for implementing functions or operations as described above. According to an embodiment, the graphical user interface 700 is configured to allow a user to control and/or monitor (e.g. change or adjust) operating parameters for the sound masking system, as described in more detail below.

As shown in FIG. 7, the graphical user interface screen 700 comprises a viewer window 710 and a sound masking control section or panel indicated generally by reference 712. For the floor plan depicted in the viewer window 710 of FIG. 7, the sound masking component layer has been configured with sound masking units indicated by references 711, 714, 716 and 718.

The screen 700 includes a "Control" button 704, a "Zoom" button 706, and a "Pan" button 708. A row 720 of functional "tabs" is also provided below the view window 712. According to an embodiment, the functional tabs comprise a system configuration tab 722, a masking control tab 724, a paging output control tab 726, a programmable keypad functions tab 728, and a reporting screen tab 729. The tabs are configured to access an associated screen or window. For example, the system software application 200 is configured to display the sound masking control panel 712 in response to a user clicking the masking control tab 724.

Referring again to FIG. 7, the sound masking control panel 712 comprises actuators and function buttons for editing data and/or changing operational parameters associated with one or more of the sound masking components in the sound masking component layer as displayed in the viewer window 710. According to an embodiment, the sound masking control panel 712 comprises a Volume Settings panel 740 and an Equalizer Settings panel 750. The sound masking control panel 712 also includes an Apply button 770 which is configured to apply the user settings to the sound masking hardware.

The Volume Settings panel 740 comprises a Volume level function button 742, a Volume Shift button 744, a Mute Masking button 746, and a Mute Paging button 748. The Volume Setting panel 740 is configured to control the volume level of the sound masking signal emitted or generated by the associated sound masking device in the sound masking system 270 (FIG. 2).

The Equalizer Settings panel 750 comprises an array of equalizer setting slide buttons 752 for setting, monitoring, and/or adjusting the spectrum of the sound masking signal. As shown, the Equalizer Settings panel 750 may also include a graphical representation 753 (e.g. bars) indicating the current equalizer settings and/or a numerical display 755 of the current equalizer settings. The Equalizer Settings panel 750 includes a Contour slide button 754 and associated numerical setting display, and a Shift slide button 756 and associated numerical setting display. The Contour slide button 754 is configured to change or adjust the contour of the sound masking signal emitted or generated by the associated sound masking device 270 (FIG. 2).

In operation, a user selects one or more of the sound masking components in the sound masking network 270 (FIG. 2) by clicking on the associated icon(s) displayed in the viewer window 710. The clicking of the sound masking component(s) enables the control functions in the sound masking control panel 712 associated with the corresponding sound masking device (hardware). According to an embodiment, the system 200 (FIG. 2) is configured to retrieve (and display in the sound masking control panel 712) component and/or setting data for the "clicked" component. For example, clicking the sound masking unit 718 enables the operator to view, change or edit the volume settings (i.e. using the controls on the Volume Setting panel 740) and/or the equalizer settings (i.e. using the controls on the Equalizer Settings panel 750), as described above.

Reference is next made to FIG. 8 which shows a screenshot of an exemplary graphical user interface screen 800 for the user interface module 220 (FIG. 2) and in conjunction with the system software application 200 (FIG. 2) is configured for implementing functions or operations as described above. According to an embodiment, the graphical user interface screen 800 is configured to provide a design function for configuring and/or populating a sound masking component layer for a design drawing.

According to an embodiment, the graphical user interface screen 800 comprises a viewer window 810 and a component design panel 820. The viewer window 810 is configured to display the design drawing 120 (FIG. 1) and/or the sound masking component layer(s) 110 (FIG. 1). The exemplary design drawing and sound masking component layer depicted in FIG. 8 corresponds to FIG. 1 (as described above). The viewer window 810 includes a Zoom button 840 and a Pan button 842 as shown. According to an embodiment, the graphical user interface screen 800 is configured to display a Parts List in a window indicated by reference 802.

Referring again to FIG. 8, the component design panel 820 is configured with buttons and controls for designing (or configuring) the sound masking component layer(s) as displayed in the viewer window 810. As shown, the component design panel 820 is configured with a row 822 of buttons, "Open", "Save", "Close" for retrieving and storing drawings in memory, e.g. memory on the computer which executes the system software application 200 (FIG. 2). The component design panel 820 includes a components selection panel 824. The components selection panel 824 displays icons corresponding to the available sound masking components and is configured with "Add", "Edit", "Remove", "Auto Number", "Zoning" and "Ping" function buttons indicated generally by reference 826. According to an embodiment, a user selects (e.g. clicks) one or more of the icons and uses the function button(s) to configure the associated component on the design drawing in the viewer window 810. As shown, the component design panel 820 includes a Layout control panel indicated by reference 828. According to an embodiment, the Layout control panel 828 is configured to allow a user to select the type of component, e.g. a power hub, configure number of rows and/or columns and/or spacing (e.g. between components). According to another aspect, the component design panel 820 includes a "Wiring Rules" function indicated by reference 830. The Wiring Rules function is configured to allow a user to select an "Auto wire" function and invoke an "Add Coupler" function to join wires. According to another aspect, the component design panel 820 is configured with a Layers function indicated by reference 832. The Layers function 832 allows a user to specify one or more layers in the design drawing, for example, for viewing.

According to an embodiment, the sound masking design screen 800 in conjunction with the system software application 200 (FIG. 1) is configured to provide the following functionality:
 open, close or save a design drawing (DWG)
 add, move, edit or remove sound masking system components
 "ping" a component to have it emit a sound to discover it's location
 auto number components
 zoning function: assign hub components to a particular keypad for control
 change component types; for example, a power hub to a primary hub
 show sound curtain function provides capability to show approximate sound coverage in the office space (e.g. visually depict as a shaded area around each hub); this function helps to determine area coverage to ensure a uniform sound throughout the space
 highlight items in the drawing.
 auto layout components in a grid fashion (rather than adding one by one) increase or decrease spacing of auto layout
 auto wire all of the components together
 add couplers (Wire joins) to split wire lengths
 show/hide layers in the DWG
 zoom or pan on the drawing
 tools for measuring area
 build parts list automatically, e.g. to order parts and/or track costs
 add annotations to document
 shape wires to follow cable trays
 show wire measurements (for example, as depicted in FIG. 6)
 keep wire with component if component is moved The present invention may be embodied in other specific forms without departing from spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An apparatus for controlling a sound masking system installed in a physical space and comprising a plurality of physical sound masking components, said apparatus comprising:
 an electronic rendering representing the physical space and including an active graphical element for each of the plurality of physical sound masking components in the sound masking system and each said active graphical element having a location in said electronic rendering corresponding to a physical location of said physical sound masking component installed in the physical space;
 a user interface configured for applying one or more inputs to one or more of said active graphical elements to control parameters associated with at least some of the physical sound masking components;
 a controller module configured to be responsive to at least some of said one or more inputs and generate one or more control signals configured to control operation of one or more of the plurality of physical sound masking components; and
 an interface configured for passing said one or more control signals to the sound masking system for controlling one or more of said physical sound masking components.

2. The apparatus as claimed in claim 1, wherein said electronic rendering comprises a computer aided design generated drawing.

3. The apparatus as claimed in claim 2, wherein said inputs comprise one or more of a sound masking signal volume setting and a sound masking signal frequency setting.

4. The apparatus as claimed in claim 2, further comprising a graphical user interface having a viewer window for displaying said electronic rendering and one or more windows for displaying said information associated with said sound masking components.

5. The apparatus as claimed in claim 1, wherein said user interface comprises a graphical user interface and includes a viewer window for displaying said electronic rendering.

6. An apparatus for configuring a sound masking system installed in a physical space, said apparatus comprising:
 a component configured to generate an electronic rendering depicting the physical space;
 a component configured to place one or more sound masking elements on said electronic rendering, each of said one or more sound masking elements representing a corresponding sound masking component physically installed in the physical space for the sound masking system;

a controller configured to interface with the sound masking system and receive information associated with the operation of said physically installed sound masking components; and each of said one or more sound masking elements including a mechanism configured to display the received information associated with the operation of said corresponding physically installed sound masking component; and wherein said mechanism is further configured to be responsive to one or more inputs for modifying operational parameters of said corresponding physically installed sound masking component, and said controller is further configured to generate one or more control commands based on said inputs and transmit said one or more control commands to the physically installed sound masking system.

7. The apparatus as claimed in claim 6, wherein said mechanism is further configured to be responsive to one or more inputs for modifying operational parameters of said corresponding sound masking component, and said controller is further configured to generate one or more control commands based on said inputs and transmit said one or more control commands to the sound masking system.

8. The apparatus as claimed in claim 7, wherein said operational parameters comprise one or more of a sound masking volume level, a sound masking frequency, and a paging volume level.

9. A non-transitory computer-readable storage medium with an executable program stored therein for controlling a sound masking system installed in a physical space, wherein the program instructs a computer to perform the steps comprising:

displaying an electronic rendering of the physical space, and said electronic rendering including one or more graphical elements corresponding to physical sound masking components in the sound masking system;

activating one or more of said graphical elements in response to an input;

retrieving operational information for the physical sound masking components installed in the physical space and corresponding to said one or more activated graphical elements;

receiving one or more inputs to modify said operational information;

generating one or more control signals corresponding to said modified operational information; and applying said one or more control signals to said associated physical sound masking component installed in the physical space.

* * * * *